US007642950B2

(12) United States Patent
Kai (10) Patent No.: US 7,642,950 B2
(45) Date of Patent: Jan. 5, 2010

(54) RADAR DEVICE WITH TRANSMISSION OUTPUT CONTROL AND TRANSMISSION OUTPUT CONTROL FUNCTION ABNORMALITY DETERMINING MEANS

(75) Inventor: Koichi Kai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 39 days.

(21) Appl. No.: 11/783,775

(22) Filed: Apr. 12, 2007

(65) Prior Publication Data

US 2008/0158046 A1 Jul. 3, 2008

(30) Foreign Application Priority Data

Oct. 27, 2006 (JP) ............................. 2006-292420

(51) Int. Cl.
*G01S 7/40* (2006.01)
*G01S 13/93* (2006.01)

(52) U.S. Cl. ........................... 342/82; 342/70; 342/165; 342/173

(58) Field of Classification Search ................... 342/73, 342/82, 85, 118, 70–72, 165, 173
See application file for complete search history.

(56) References Cited

U.S. PATENT DOCUMENTS

| 5,910,786 | A  | * | 6/1999 | Watanabe ............... 342/70 |
| 6,414,628 | B1 | * | 7/2002 | Ashihara .................. 342/173 |
| 6,825,799 | B2 | * | 11/2004 | Isaji ....................... 342/173 |
| 7,109,915 | B2 | * | 9/2006 | Kurodai et al. ........... 342/82 |
| 7,397,419 | B2 | * | 7/2008 | Nakano et al. ............ 342/173 |

FOREIGN PATENT DOCUMENTS

| DE | 19523528 A1 | 8/1996 |
| JP | 62-259111 A | 11/1987 |
| JP | 08-122437 A | 5/1996 |
| JP | 08-170987 A | 7/1996 |
| JP | 10-002952 A | 1/1998 |
| JP | 10-213650 A | 8/1998 |
| JP | 2000/338241 A | 8/2000 |
| JP | 2001-141804 A | 5/2001 |
| JP | 2005-249623 A | 9/2005 |

OTHER PUBLICATIONS

Machine translation of JP H8-170987.*

* cited by examiner

*Primary Examiner*—Thomas H Tarcza
*Assistant Examiner*—Cassi Galt
(74) *Attorney, Agent, or Firm*—Sughrue Mion, PLLC

(57) ABSTRACT

Provided is a radar device includes a transmitting unit, a receiving unit for receiving the electromagnetic wave reflected by a target object of the transmission electromagnetic wave, a target object measuring unit for measuring at least a distance between the radar device and the target object on the basis of the transmission and reception electromagnetic waves, a transmission output control unit (S1, S2) for stopping or reducing a transmission output of the transmitting unit under a predetermined condition, a transmission output control function abnormality determining unit (S3 to S6) for determining that the transmission output control unit is abnormal upon receiving the reception electromagnetic wave having an intensity exceeding a predetermined threshold value even at the time of one of stop and reduction of the transmission output, and an abnormality determination time processing unit (S7) for stopping a power supply of the radar device when an abnormality is determined.

12 Claims, 8 Drawing Sheets

RADAR DEVICE WITH TRANSMISSION OUTPUT CONTROL AND TRANSMISSION OUTPUT CONTROL FUNCTION ABNORMALITY DETERMINING MEANS

BACKGROUND OF THE INVENTION

1. Field of the Invention

The present invention relates to a radar device, and more particularly, to an in-vehicle radar device.

2. Description of the Related Art

As a conventional radar device of this type, there is an in-vehicle automatic cruising device having radar means for detecting an inter-vehicle distance from a preceding vehicle, velocity detecting means for detecting a velocity of a subject vehicle, and arithmetic processing means for outputting a velocity command to a vehicle velocity changing mechanism so as to keep an appropriate inter-vehicle distance on the basis of the inter-vehicle distance and the subject vehicle velocity. The in-vehicle automatic cruising device also includes determining means for determining whether the subject vehicle is in a substantially stop state or a normal travel state on the basis of the inter-vehicle distance and the subject vehicle velocity, and control means for controlling an output of the radar means according to the travel state determined by the determining means. With the above configuration, when the subject vehicle is in the substantially stop state, a power of a laser beam is reduced so that even when an eye of a pedestrian around the subject vehicle is erroneously irradiated with the laser beam, the eye is not injured, thus making it possible to ensure safety of the pedestrian around the subject vehicle (for example, see JP 62-259111 A).

Also, in an energy projection type sensing system in which an energy is projected to the outside to observe a reaction on the basis of the projected energy, there are provided diagnosing means for diagnosing a presence or absence of a state where an adverse affect may occur due to the projection of the energy, energy projection control means for limiting the irradiation of the energy when the diagnosing means diagnoses that the state described above is present. With the above configuration, the system can flexibly cope with a status change of environments to which the energy is to be projected, so as to prevent the subject environment from being adversely affected by the energy projection in advance (for example, see JP 10-2952 A).

At present, a frequency of 76 to 77 GHz of a millimeter wave band is allowed in respective countries for the in-vehicle radar device. For example, in U.S.A., Federal Communications Commission (FCC) regulates transmission outputs of electromagnetic waves at a time of stop and traveling with the in-vehicle radar millimeter wave band, and an upper limit of the transmission output at the time of stop must be smaller than the upper limit of the transmission output at the time of traveling. Hence, in the in-vehicle radar device having a configuration that complies with the FCC, in a case where the transmission output at the time of traveling is larger than the upper limit of the transmission output at the time of stop, the radar device is required to have a function of reducing the transmission output at the time of stop to be lower than the upper limit of the transmission output at the time of stop, or stopping the transmission output in a case where it is unnecessary to detect a target object at the time of stop.

As described above, as the radar device of this type, there is required a radar device that surely stops or reduces the transmission output at the time of stop.

SUMMARY OF THE INVENTION

The present invention has been made in view of the above circumstances, and therefore an object of the present invention is to provide a radar device for stopping or reducing a transmission output under a predetermined condition, which is capable of determining whether the transmission output is being stopped or reduced, and surely stopping or reducing the transmission output when it is determined that the transmission output is not stopped or reduced.

According to an aspect of the present invention, there is provided a radar device, including: transmitting means for transmitting an electromagnetic wave; receiving means for receiving the electromagnetic wave reflected by a target object of the transmission electromagnetic wave; target object measuring means for measuring at least a distance between the radar device and the target object on the basis of the transmission electromagnetic wave and the reception electromagnetic wave; transmission output control means for performing one of stopping and reducing a transmission output of the transmitting means under a predetermined condition; and transmission output control function abnormality determining means for determining that the transmission output control means is abnormal upon receiving the reception electromagnetic wave having an intensity exceeding a predetermined threshold value even at the time of one of stop and reduction of the transmission output.

According to the present invention, the radar device for stopping or reducing the transmission output under the predetermined condition may further include means for determining whether the stop or reduction of the transmission output is being conducted or not, to confirm a transmission output state and to surely stop the transmission output.

DETAILED DESCRIPTION OF THE PREFERRED EMBODIMENTS

Now, a description will be given in more detail of preferred embodiments of the present invention.

First Embodiment

Figure 1:
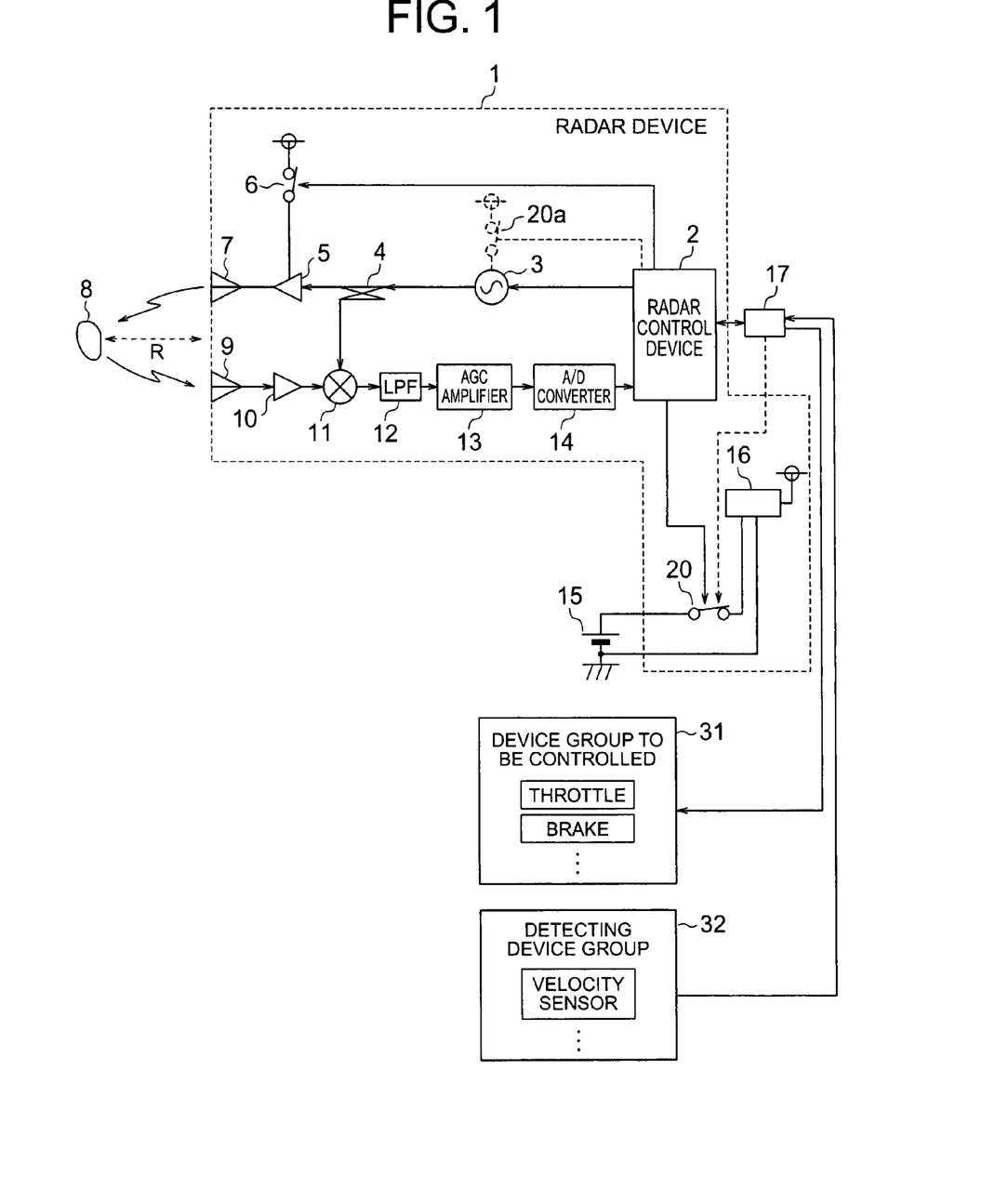
FIG. 1 is a diagram showing a configuration of an ACC system including a radar device according to a first embodiment of the present invention.

FIG. 1 is a diagram showing a configuration of an adaptive cruise control (ACC) system including a radar device according to an embodiment of the present invention. A radar device 1 includes a radar control device 2 including a CPU that controls the radar device and a memory, a voltage control oscillator 3 that generates electromagnetic waves of, for example, 76 to 77 GHz in transmission frequencies, a distributor 4 for distributing the power of the electromagnetic wave of the voltage control oscillator 3 to a transmission amplifier 5 and a receiver mixer 11, the transmission amplifier 5 that amplifies the power of the electromagnetic wave which is supplied from the distributor 4, a transmission output control switch 6 that controls an on/off operation of the transmission amplifier 5, and a transmission antenna 7 that transmits the electromagnetic wave that has been amplified by the transmission amplifier 5 to a space.

The radar device 1 further includes a reception antenna 9 that receives a reflected (reception) electromagnetic wave of the transmission electromagnetic wave reflected and returned by a target object 8 which is detected by the radar device 1, a reception amplifier 10 that amplifies the reception electromagnetic wave, the receiver mixer 11 that mixes a transmission electromagnetic wave (transmission electromagnetic wave power signal) from the distributor 4 with the reflected electromagnetic wave (reception electromagnetic wave power signal) from the target object 8 to output a beat signal according to a distance R and a relative velocity of the target object 8, a low-pass filter (LPF) 12, an automatic gain control (AGC) amplifier 13 which is capable of adjusting the gain according to the reception electromagnetic wave power, an A/D converter 14 that converts the beat signal and the like into a digital signal, an internal power supply circuit 16 that controls a voltage that is supplied from an external power supply 15 outside the radar device 1 to supply a constant voltage to parts inside the radar device 1 (power supply to the respective portions other than the transmission amplifier 5 is omitted in the figure), and an internal power supply switch 20 that blocks the power from the external power supply 15 which is to be supplied to the internal power supply circuit 16.

Also, an adaptive cruise control (ACC) controller 17 is connected to a device group to be controlled 31 including a throttle or a brake of a vehicle (not shown) to which the radar device 1 is mounted, and a detecting device group 32 including a velocity sensor for detecting the travel state of the vehicle, or the like. The ACC controller 17 transmits a subject vehicle velocity and other control information to the radar device 1, receives detected information such as a distance to the target object and the relative velocity from the radar device 1, operates the throttle and the brake on the basis of the received information, and adjusts the velocity of the subject vehicle.

Figure 2:
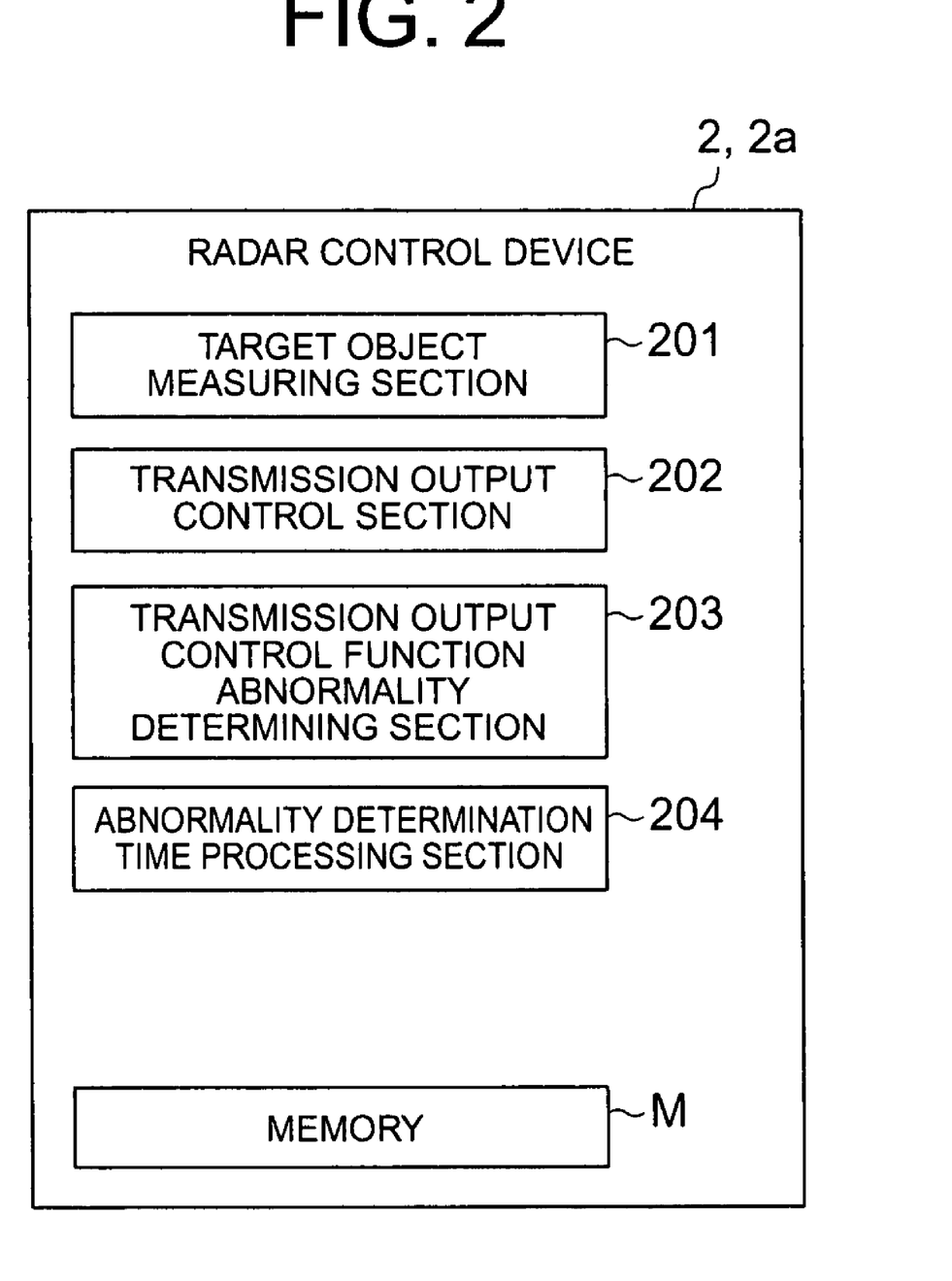
FIG. 2 is a block diagram showing functions of a radar control device according to the present invention.

FIG. 2 shows a block diagram of functions of the radar control device 2 shown in FIG. 1. The radar control device 2 includes a target object measuring section 201 that measures the distance to the target object 8 from the radar device 1 and the relative velocity of the target object 8 with respect to the radar device 1 on the basis of the transmission electromagnetic wave and the reception electromagnetic wave, that is, the beat signal, a transmission output control section 202 that controls to stop or reduce the output of the transmission electromagnetic wave under a specific condition, a transmission output control function abnormality determining section 203 that determines the abnormality of the transmission output control according to a value based on the reception electromagnetic wave at the time of stop or reducing the transmission output, an abnormality determination time processing section 204 that conducts the processing when the abnormality is determined, and a memory M that saves the data.

The voltage control oscillator 3, the distributor 4, the transmission amplifier 5, and the transmission antenna 7 constitute transmitting means. The reception antenna 9, the reception amplifier 10, the receiver mixer 11, the LPF 12, the AGC amplifier 13, and the A/D converter 14 constitute receiving means. The target object measuring section 201 constitutes target object measuring means. The transmission output control switch 6 and the transmission output control section 202 constitute transmission output control means. The transmission output control function abnormality determining section 203 constitutes transmission output control function abnormality determining means. Also, the internal power supply switch 20, the abnormality determination time processing section 204, and the ACC controller 17 constitute abnormality determination time processing means.

Figure 3:
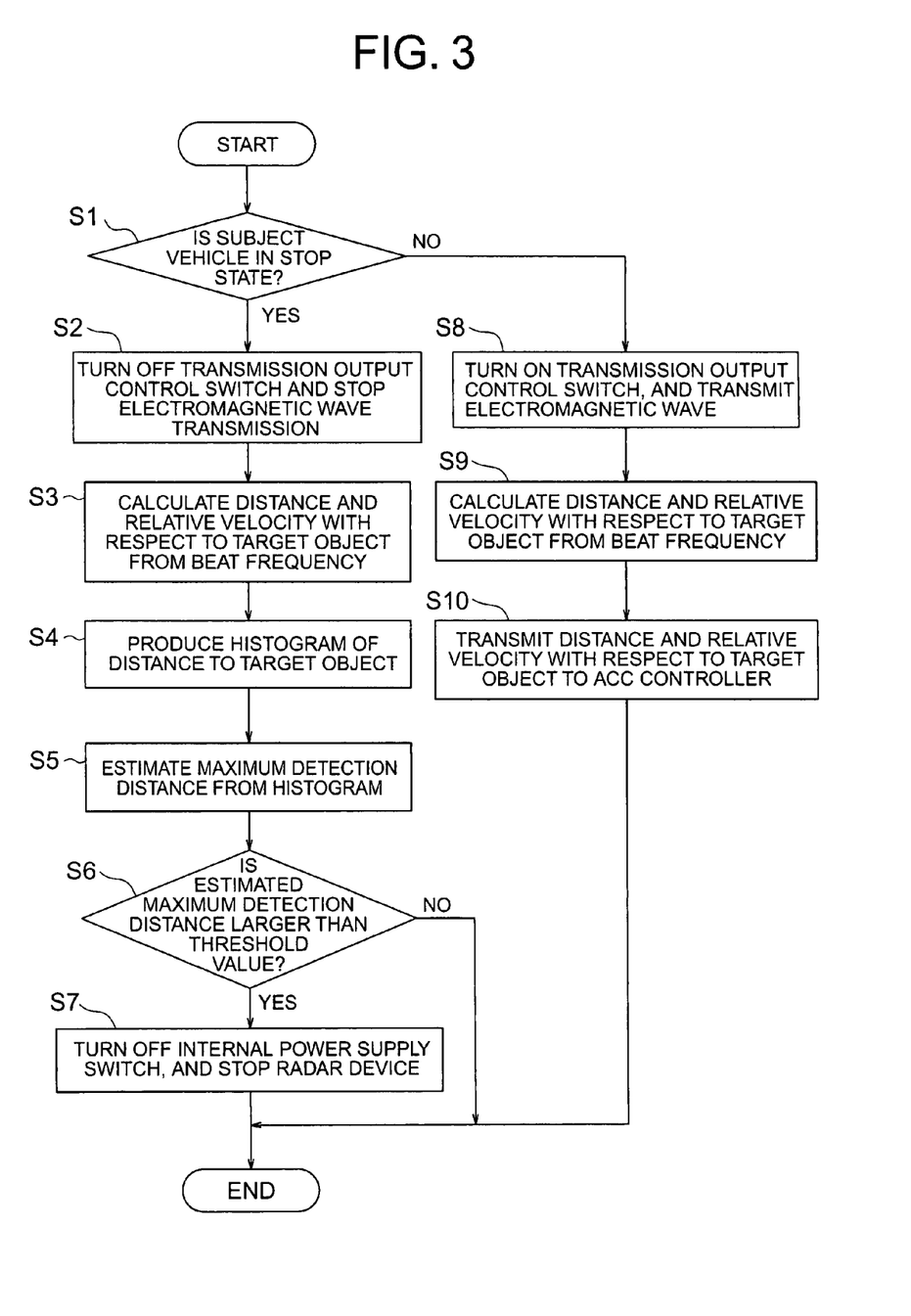
FIG. 3 is flowchart showing an operation of a radar control device according to the first embodiment of the present invention.

FIG. 3 shows a flowchart of the operation of the radar control device 2, and the operation will be described below. Steps S3, S9, and S10 correspond to the operation of the target object measuring section 201, Steps S1, S2, and S8 correspond to the operation of the transmission output control section 202, Steps S4 to S6 correspond to the operation of the transmission output control function abnormality determining section 203, and Step S7 corresponds to the operation of the abnormality determination time processing section 204.

The radar control device 2 determines whether the subject vehicle is in a stop state or not (Step S1). The ACC controller 17 transmits the subject vehicle velocity information that is obtained from a vehicle sensor or the like of the detecting device group 32 to the radar control device 2, and the radar control device 2 determines whether the subject vehicle is in a stop state or not, by using the subject vehicle velocity information.

Alternatively, it is possible that the detecting device group 32 includes a sensor that detects the respective wheel velocities, and the ACC controller 17 transmits the respective wheel velocities so that the radar control device 2 can use the respective wheel velocities. Likewise, the ACC controller 17 may use a signal indicative of the subject vehicle stop state that is obtained from those signals.

When the vehicle is not in the stop state, that is, when the vehicle is traveling, the transmission output control switch 6 is turned on to transmit the electromagnetic wave from the transmission antenna 7 (Step S8). The reflected (reception) electromagnetic wave obtained by reflecting and returning the transmission electromagnetic wave by the target object 8 is received by the reception antenna 9. Then, the transmission electromagnetic wave power signal from the distributor 4 and the reception electromagnetic wave power signal from the reception antenna 9 are mixed together in the mixer 11 to obtain a beat signal. The beat signal is inputted to the radar control device 2 through the LPF 12, the AGC amplifier 13, and the A/D converter 14. The radar control device 2 analyzes the frequency of the obtained beat signal, and calculates the distance to the target object 8 from the radar device 1 and the relative velocity according to the beat frequency (Step S9). The radar control device 2 then transmits information such as the distance or the relative velocity with respect to the target object 8 to the ACC controller 17 (Step S10).

On the other hand, when it is determined that the subject vehicle is in a stop state in Step S1, the transmission output control switch 6 is turned off to stop the electromagnetic wave transmission output (Step S2). Then, likewise, the radar control device 2 analyzes the frequency of the beat signal that is outputted from the mixer 11 and obtained through the LPF 12, the AGC amplifier 13, and the A/D converter 14, and calculates the distance and the relative velocity with respect to the target object 8 (Step S3). In the case where the subject vehicle is in a stop state, the radar control device 2 can calculate only the distance. There may be a case where there is no target object 8 at all. However, in most cases, there are a plurality of target objects such as other vehicles or constructions on a road. Various methods (frequency modulated-continuous wave (FM-CW) system or the like) have been already proposed as a method of calculating the distance and the relative velocity with respect to the target object 8, and therefore description thereof will be omitted.

Figure 4:
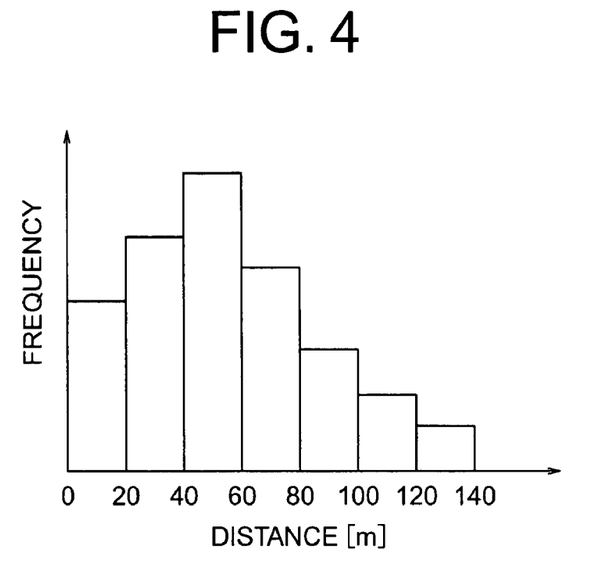
FIG. 4 is a diagram showing an example of a histogram at a time of traveling which is produced in the radar control device according to the present invention.

The radar control device 2 stores data such as the distance to the target object 8 which has been obtained after it is determined that the subject vehicle is in a stop state in the memory M, and produces the histogram (indicative of a relationship between the distance and the frequency) of the obtained distances of the plurality of target objects 8 (Step S4). An example of the histogram at the time of traveling is shown in FIG. 4. The maximum detection distance of the radar device 1 is estimated on the basis of the histogram obtained in Step S4 (Step S5). The maximum detection distance is a distance that is largest in number (frequency) among the distances that are shown in the histogram or stored in the memory.

When the radar device 1 is normally operated, because the transmission output is stopped at the time of stop, the target object cannot be detected, that is, nothing can be detected (maximum detection distance=0 m). However, in the case where the electromagnetic wave is transmitted due to some abnormality although the transmission output stop operation is conducted, because the target object can be detected as in the time of traveling, the maximum detection distance exceeds 0 m. Also, even in the case where the noise in the interior of the radar device 1 is detected and the transmission output is stopped, there is the possibility of erroneously detecting the target object 8 with an artificial distance and relative velocity due to the noise. In this case, a section that is largest in distance among sections in which data exceeding a predetermined frequency exists may be set as the maximum detection distance.

Then, the radar control device 2 determines whether the maximum detection distance is 0 m, or whether the maximum detection distance is exceeding a predetermined threshold value (a value of the distance by which the stoppage of the transmission output can be determined) or not (Step S6). In the case where the maximum detection distance exceeds the predetermined threshold value, the radar control device 2 turns off the internal power supply switch 20, perfectly stops the operation of the radar device 1, and surely stops the transmission of the electromagnetic wave (Step S7).

In the above description, the radar control device 2 turns off the internal power supply switch 20 to stop the entire operation of the radar device 1. However, there may be provided a switch at a position where the transmission output can be stopped, such as an internal power supply switch 20a indicated by a broken line in FIG. 1 provided only for turning off the power supply of the voltage control oscillator 3.

Figure 5:
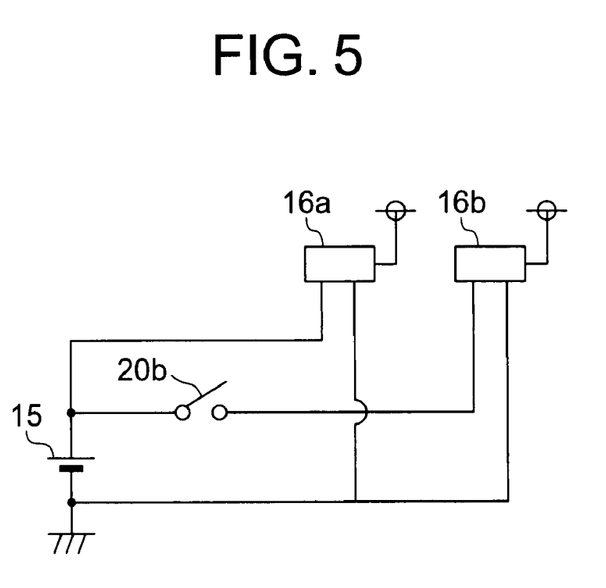
FIG. 5 is a diagram showing an example of a configuration of an internal power supply circuit in the radar device according to the present invention.

Also, as shown in FIG. 5, it is possible that an internal power supply circuit 16a of the radar control device 2 and an internal power supply circuit 16b for electromagnetic wave transmission (of the transmitting means) from the voltage control oscillator 3 to the transmission antenna 7 be provided separately, and only the power supply of the internal power supply circuit 16b for electromagnetic wave transmission be stopped by an internal power supply switch 20b.

Also, the ACC controller 17 may be caused to control the on/off operation of the power supply to the radar device 1 from the external power supply as indicated by a broken line in FIG. 1, and an abnormality signal may be outputted to the ACC controller 17 from the radar control device 2 in the case where it is determined that the transmission output is not stopped. In the case where the ACC controller 17 receives the abnormality signal from the radar device 1, the ACC controller 17 may turn off the power supply to the radar device 1.

In addition, in the case where the radar device 1 is not provided with the internal power supply circuits 16, 16a, and 16b, the internal power supply switches 20, 20a, and 20b, and receives the power supply from the ACC controller 17 that is an external device, when the ACC controller 17 receives the abnormality signal from the radar control device 2, the ACC controller 17 may stop the power supply to the radar device 1.

Further, in the above description, in Step S7, the radar control device 2 stops the power supply of the radar device 1 in the case where the radar control device 2 determines that the transmission output control function is abnormal. Alternatively, the radar control device 2 can generate a signal or sound for notifying the external of the abnormality rather than stopping the power supply to the radar device 1.

Also, in the above description, in Steps S4 and S5 of FIG. 3, the maximum detection distance is estimated by using the histogram to determine whether the electromagnetic wave is being transmitted or not depending on whether the maximum detection distance is exceeding the threshold value or not. However, the abnormality may be more simply determined when the distance between the radar device and the target object exceeds the predetermined threshold value.

Also, another abnormality determining means involves counting up the number of detected target objects 8 to determine the abnormality based on whether the count is exceeding the threshold value or not. Basically, it is only necessary that the abnormality determining means transmit the electromagnetic wave to determine whether the target object 8 can be detected or not.

Also, it is considered that the noises within the radar device 1 hardly change temporally. On the contrary, in the case where there is a moving target object 8, the distance temporally varies different from the noise. This phenomenon can be used to distinguish the noises from the target object 8 that is actually detected. That is, in the transmission output stop state, in the case of conducting the abnormality determination of the transmission output control function, the abnormality may be determined under the condition where the distance between the radar device and the target object temporally varies.

In addition, in the case of conducting the determination on the basis of the comparison with the threshold value, the abnormality may be determined when a state where the detected value is exceeding the predetermined threshold value continues for a predetermined period of time, thereby making it possible to enhance the reliability of the determination.

Further, as the conditions for stopping or reducing the transmission output (refer to second and third embodiments described later), a case where the subject vehicle is in a stop state has been described. However, as other conditions, for example, the subject vehicle may be in a state where the velocity thereof is close to the stoppage, which is equal to or lower than a predetermined velocity. This state is obtained from the subject vehicle velocity information from the ACC controller 17.

In Step S3 of FIG. 3, the distance and the relative velocity of the target object are calculated by the target object measuring section 201 that measures the target object at the time of the normal travel. At the time of stop, however, the calculation may be conducted by the transmission output control function abnormality determining section 203.

As is apparent from the above, according to the radar device of this embodiment, it is possible to confirm whether the transmission output is actually stopped or not when the transmission output stop operation is conducted at the time of stop of the vehicle, and in the case where the transmission output is not stopped due to some abnormality, it is possible to surely stop the transmission output.

Second Embodiment

Figure 6:
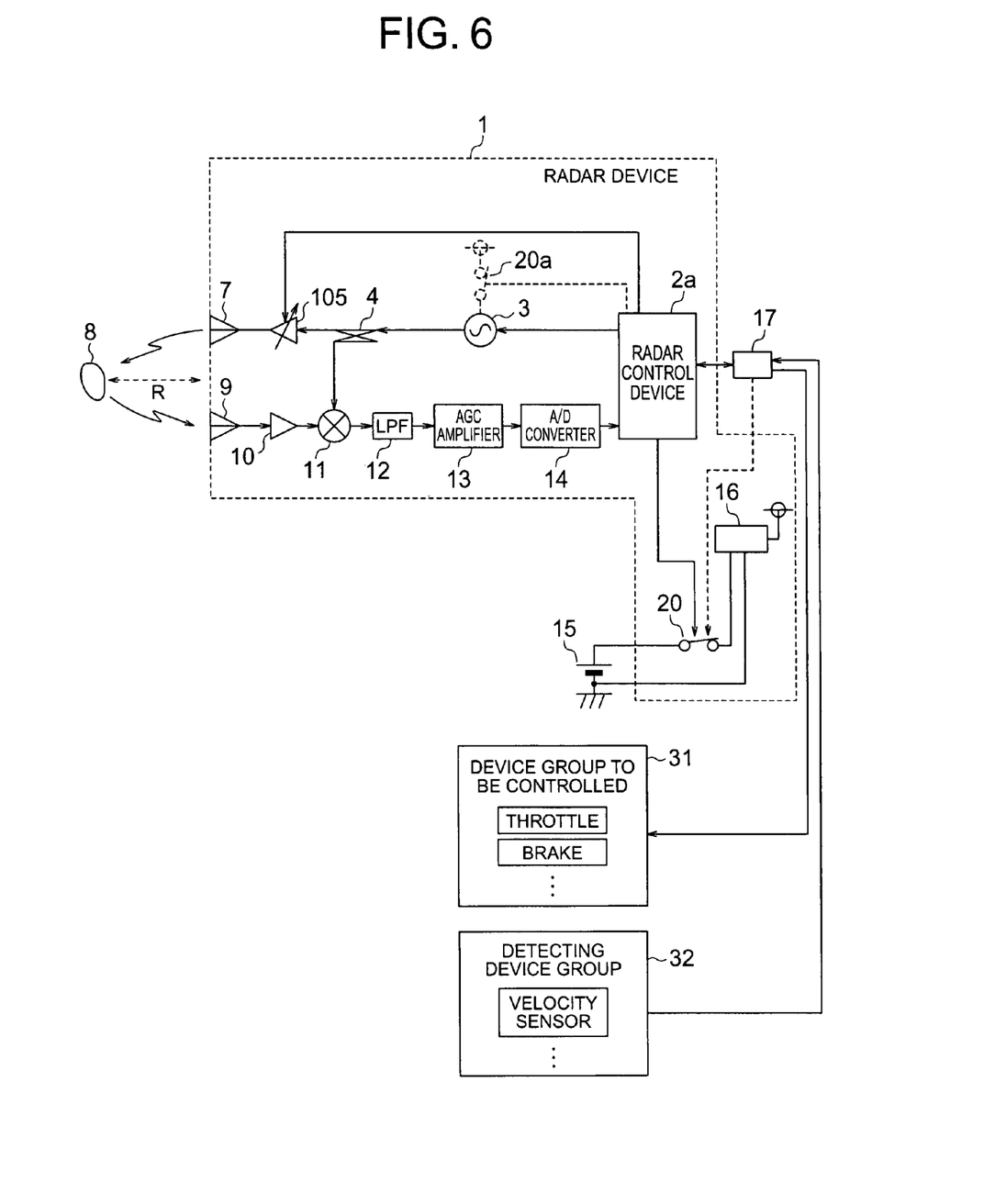
FIG. 6 is a diagram showing a configuration of an ACC system including a radar device according to second and third embodiments of the present invention.

FIG. 6 is a diagram showing a configuration of an ACC system including a radar device according to other embodiments of the present invention. In FIG. 6, the same or corresponding parts as those in the above embodiment are denoted by the same reference numerals, and description thereof will be omitted. A radar control device 2a is a control section of the radar device 1 including a CPU and a memory according to this embodiment. A transmission variable gain amplifier 105 amplifies the electric power of the electromagnetic wave that is supplied from the distributor 4, and has a gain controlled by the radar control device 2a. The transmission variable gain amplifier 105 and the transmission output control section 202 constitute transmission output control means.

Figure 7:
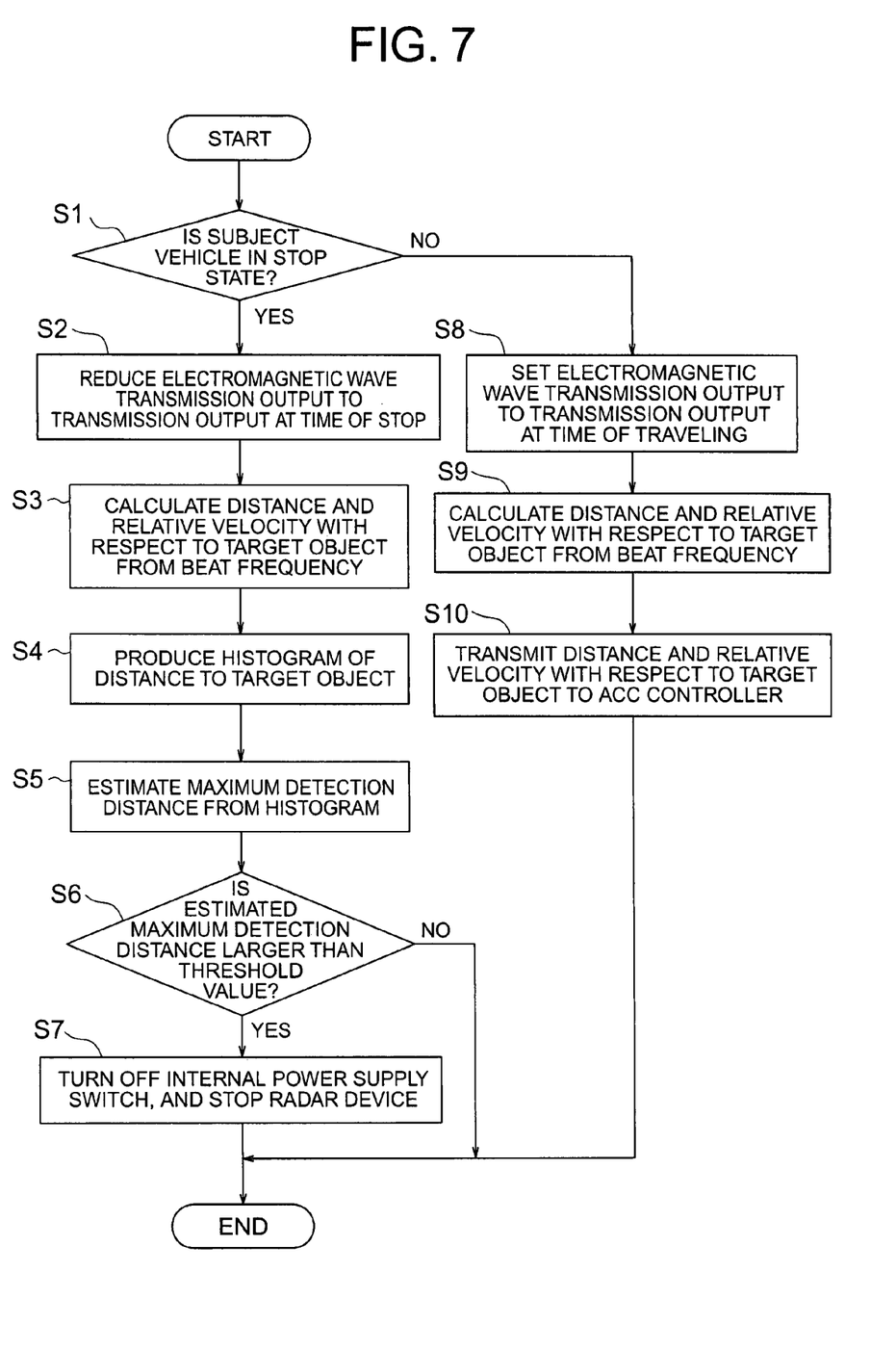
FIG. 7 is a flowchart showing an operation of a radar control device according to the second embodiment of the present invention.

FIG. 7 shows a flowchart of the operation of the radar control device 2a, and the operation will be described below. The functional block diagram of the radar control device 2a is basically identical to that shown in FIG. 2. Steps S3, S9, and S10 correspond to the operation of the target object measuring section 201, Steps S1, S2, and S8 correspond to the operation of the transmission output control section 202, Steps S4 to S6 correspond to the operation of the transmission output control function abnormality determining section 203, and Step S7 corresponds to the operation of the abnormality determination time processing section 204.

The radar control device 2a determines whether the subject vehicle is in a stop state or not (Step S1). The radar control device 2a determines whether the subject vehicle is in a stop state or not by using the subject vehicle velocity information from the ACC controller 17 as in the above embodiment.

When the subject vehicle is not in the stop state, that is, when the subject vehicle is traveling, the radar control device 2a controls the gain of the transmission variable gain amplifier 105 to be increased to the gain at the time of traveling, and sets the electromagnetic wave transmission output to the transmission output at the time of traveling. Then, the radar control device 2a transmits the electromagnetic wave from the transmission antenna 7 (Step S8). The reflected (reception) electromagnetic wave of the transmission electromagnetic wave reflected and returned by the target object 8 is received by the reception antenna 9. Then, the transmission electromagnetic wave power signal from the distributor 4 and the reception electromagnetic wave power signal from the reception antenna 9 are mixed together in the mixer 11 to obtain a beat signal. The beat signal is inputted to the radar control device 2a through the LPF 12, the AGC amplifier 13, and the A/D converter 14. The radar control device 2a analyzes the frequency of the obtained beat signal, and calculates the distance to the target object 8 from the radar device 1 and the relative velocity according to the beat frequency (Step S9). The radar control device 2a then transmits information such as the distance and the relative velocity with respect to the target object 8 to the ACC controller 17 (Step S1 0).

On the other hand, when it is determined that the subject vehicle is in a stop state in Step S1, the radar control device 2a controls the gain of the transmission variable gain amplifier 105 to be decreased to the gain at the time of stop, and sets the electromagnetic wave transmission output down to the transmission output at the time of stop (Step S2). Then, likewise, the radar control device 2a analyzes the frequency of the beat signal that is outputted from the mixer 11 and obtained through the LPF 12, the AGC amplifier 13, and the A/D converter 14, and calculates the distance and the relative velocity with respect to the target object 8 (Step S3). In the case where the subject vehicle is in the stop state, the radar control device 2a may calculate only the distance.

Figure 8:
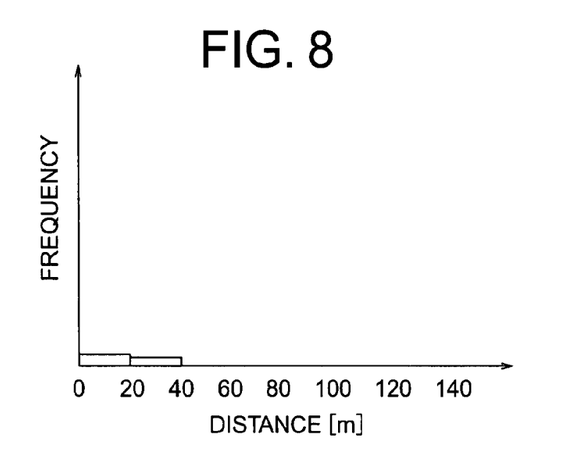
FIG. 8 is a diagram showing an example of a histogram at a time of stop which is produced in the radar control device according to the present invention.

The radar control device 2a stores data such as the distance to the target object 8 which has been obtained after it is determined that the subject vehicle is in the stop state in the memory M, and produces a histogram (indicative of a relationship between the distance and the frequency) of the obtained distances of the plurality of target objects 8 (Step S4). The histogram at the time of traveling where the transmission output is not reduced is shown in FIG. 4, and the histogram at the time of stop where the transmission output is reduced is shown in FIG. 8. The maximum detection distance of the radar device 1 is estimated on the basis of the histogram obtained in Step S4 (Step S5).

When the radar device 1 is normally operated, and the gain of the transmission variable gain amplifier 105 is controlled to the gain at the time of stop, because the transmission output is small, the maximum detection distance becomes equal to or lower than the threshold value at the time of stop which is predetermined according to the transmission output decrement. However, in the case where the gain of the transmission variable gain amplifier 105 is set to the gain at the time of traveling regardless of the fact that the subject vehicle is in a stop state, due to some abnormality, and the transmission output becomes large, because the same maximum detection performance as that at the time of traveling can be obtained, the maximum detection distance exceeds the threshold value at the time of stop.

Then, the radar control device 2a determines whether the maximum detection distance is exceeding the threshold value or not (Step S6). In the case where the maximum detection distance is exceeding the predetermined threshold value, the radar control device 2a turns off the internal power supply switch 20, perfectly stops the operation of the radar device 1, and surely stops the transmission of the electromagnetic wave (Step S7).

In Step S3 of FIG. 7, the target object measuring section 201 that conducts the measurement of the target object at the time of normal traveling calculates the distance and the relative velocity of the target object, but the calculation may be conducted by the transmission output control function abnormality determining section 203 at the time of stop.

As is apparent from the above, according to the radar device of this embodiment, when it is necessary to reduce the transmission output at the time of stop of the vehicle, it is possible to confirm whether the transmission output is correctly reduced or not. In the case where the transmission output is not reduced due to some abnormality, it is possible to surely stop the transmission output.

Third Embodiment

A configuration of an ACC system including a radar device according to a third embodiment is basically identical to that shown in FIG. 6. In this embodiment, the radar control device 2a determines the abnormality of the transmission output control function on the basis of the distance of the target object and the intensity of the receive electromagnetic wave.

Figure 9:
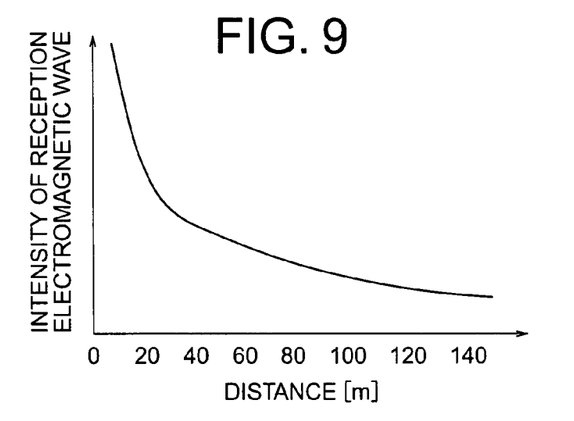
FIG. 9 is a diagram for explaining an intensity of a reception electromagnetic wave in the radar device.
Figure 10:
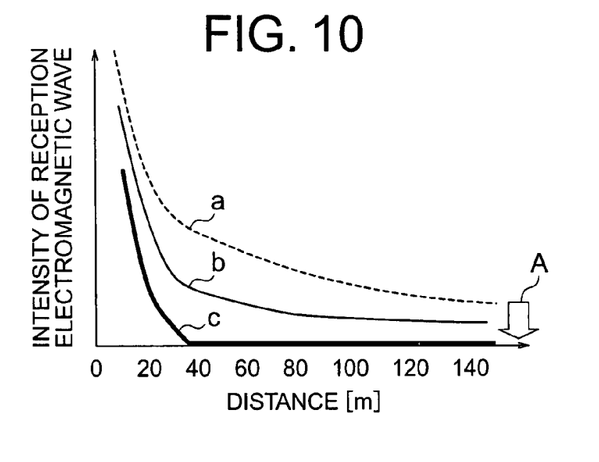
FIG. 10 is a diagram for explaining an intensity of a reception electromagnetic wave in the radar device according to the third embodiment of the present invention.

As shown in FIG. 9, because the electric power (intensity) of the reception electromagnetic wave is in inverse proportion to fourth power of the distance, the electric power of the reception electromagnetic wave becomes small as the distance to the target object becomes large. Because the amount of reflection of the electromagnetic wave varies depending on the type of the target object, the electric power of the reception electromagnetic wave results in various values. However, the same distribution as that shown in FIG. 9 can be obtained by averaging a large number of measurement values. In the case where the transmission output is reduced, the electric power of the reception electromagnetic wave is reduced in all of the distances as indicated by an arrow A of FIG. 10 (from a state "a" to a state "c"). The intensity of the reception electromagnetic wave is measured simultaneous to the distance of the target object, the threshold value of the intensity of the reception electromagnetic wave (indicated by reference symbol "b" in FIG. 10) is set in each of the distance sections of the target object, and when the intensity of the reception electromagnetic wave exceeds the threshold value in any distance section, it is possible to determine that some abnormality has occurred, and the transmission output is not reduced.

Figure 11:
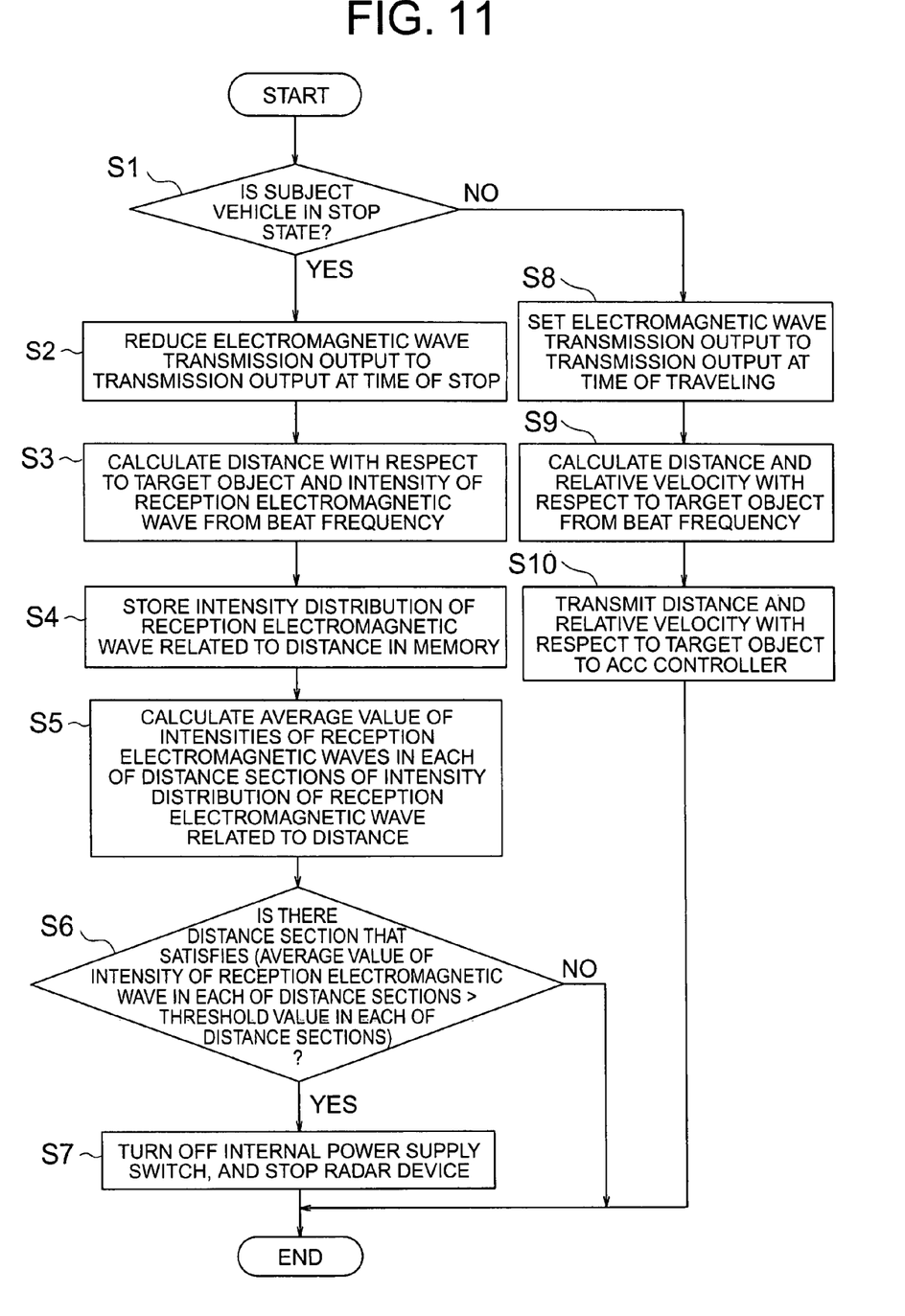
FIG. 11 is a flowchart showing an operation of a radar control device according to the third embodiment of the present invention.

FIG. 11 shows a flowchart of the operation of the radar control device 2a of this embodiment, and the operation will be described below. The functional block diagram of the radar control device 2a is basically identical to that shown in FIG. 2. Steps S3, S9, and S10 correspond to the operation of the target object measuring section 201, Steps S1, S2, and S8 correspond to the operation of the transmission output control section 202, Steps S4 to S6 correspond to the operation of the transmission output control function abnormality determining section 203, and Step S7 corresponds to the operation of the abnormality determination time processing section 204.

The radar control device 2a determines whether the subject vehicle is in a stop state or not (Step S1). The radar control device 2a determines whether the subject vehicle is in a stop state or not by using the subject vehicle velocity information from the ACC controller 17 as in the above embodiment.

When the subject vehicle is not in the stop state, that is, when the subject vehicle is traveling, the radar control device 2a controls the gain of the transmission variable gain amplifier 105 to be increased to the gain at the time of traveling, and sets the electromagnetic wave transmission output to the transmission output at the time of traveling. Then, the radar control device 2a transmits the electromagnetic wave from the transmission antenna 7 (Step S8). The reflected (reception) electromagnetic wave of the transmission electromagnetic wave reflected and returned by the target object 8 is received by the reception antenna 9. Then, the transmission electromagnetic wave power signal from the distributor 4 and the reception electromagnetic wave power signal from the reception antenna 9 are mixed together in the mixer 11 to obtain a beat signal. The beat signal is inputted to the radar control device 2a through the LPF 12, the AGC amplifier 13, and the A/D converter 14. The radar control device 2a analyzes the frequency of the obtained beat signal, and calculates the distance to the target object 8 from the radar device 1 and the relative velocity according to the beat frequency (Step S9). The radar control device 2a then transmits information such as the distance and the relative velocity with respect to the target object 8 to the ACC controller 17 (Step S10).

On the other hand, when it is determined that the subject vehicle is in the stop state in Step S1, the radar control device 2a controls the gain of the transmission variable gain amplifier 105 to be decreased to the gain at the time of stop, and sets the electromagnetic wave transmission output down to the transmission output at the time of stop (Step S2). Then, the radar control device 2a analyzes the frequency of the beat signal that is outputted from the mixer 11 and obtained through the LPF 12, the AGC amplifier 13, and the A/D converter 14, and calculates the distance with respect to the target object 8 and the intensity of the reception electromagnetic wave (Step S3). In the case where the subject vehicle stops, the radar control device 2a can calculate only the distance.

Subsequently, the radar control device 2a stores the distances of the plurality of target objects 8 and the intensities of the reception electromagnetic waves which have been obtained after it is determined that the subject vehicle is in the stop state, for example, as data of the intensity distribution of the reception electromagnetic waves related to the distance, in the memory M (Step S4). Then, the radar control device 2a breaks the data of the intensity distribution of the reception electromagnetic waves related to the distance of the target object 8 stored in the memory M into a plurality of sections with respect to the distance, and then calculates the average value of the intensity of the reception electromagnetic waves for each of the distance sections (Step S5).

When the radar device 1 is normally operated, and the gain of the transmission variable gain amplifier 105 is controlled to the gain at the time of stop, because the transmission output is small, the average value of the intensities of the reception electromagnetic waves in each of the distances becomes equal to or lower than the threshold value at the time of stop which is predetermined in each of the sections. However, in the case where the gain of the transmission variable gain amplifier 105 is set to the gain at the time of traveling regardless of the fact that the subject vehicle is in the stop state, due to some abnormality, and the transmission output becomes large, the average value of the intensities of the reception electromagnetic waves in each of the sections exceeds the threshold value at the time of stop.

Then, the radar control device 2a determines whether the average value of the intensities of the reception electromagnetic waves in each of the distance sections is exceeding the threshold value at the time of stop in each of the distance sections or not (Step S6). Then, in the case where the average value of the intensities of the reception electromagnetic waves is exceeding the threshold value in any of the distance sections, the radar control device 2a turns off the internal power supply switch 20, perfectly stops the operation of the radar device 1, and surely stops the transmission of the electromagnetic wave (Step S7).

In the above description, the abnormality is determined taking a relation between the intensity of the reception electromagnetic wave and the distance of the target object into consideration. However, the intensity of the reception electromagnetic wave that is reflected by the target object and received by the reception antenna may be measured to more simply determine the abnormality when the measured intensity exceeds the predetermined threshold value.

The intensity of the reception electromagnetic wave may be obtained from the beat signal, but the radar control device 2a may also directly receive the reception electromagnetic wave power signal that is an output of the reception amplifier 10 by an envelope detection method or the like.

Also, in Step S3 of FIG. 11, the target object measuring section 201 that measures the target object at the time of normal traveling analyzes the frequency of the beat signal, and calculates the distance of the target object and the intensity of the reception electromagnetic wave. However, at the time of stop, the transmission output control function abnormality determining section 203 may execute the above-mentioned operation.

In addition, in the above description, the radar device for reducing the transmission output is described. However, this embodiment can be applied to a radar device for stopping a transmission output as in the first embodiment.

In view of the above, according to the radar device according to the third embodiment of the present invention, when the operation of reducing the transmission output at the time of stop is conducted, and when determination is made on whether the transmission output is correctly reduced or not, even in the case where the target object is not far, by setting a threshold value corresponding to the distance, it is possible to determine whether the transmission output is normally reduced or not based on the distance of the target object and the intensity of the reception electromagnetic wave.

The present invention is not limited to the respective embodiments and can be applied to available combinations of the above respective embodiments and other embodiments having the features described in the respective embodiments above.

What is claimed is:

1. A radar device, comprising:
   transmitting means for transmitting an electromagnetic wave;
   receiving means for receiving the electromagnetic wave reflected by a target object of the transmission electromagnetic wave;
   target object measuring means for measuring at least a distance between the radar device and the target object on the basis of the transmission electromagnetic wave and the reception electromagnetic wave;
   transmission output control means for performing one of stopping and reducing a transmission output of said transmitting means under a predetermined condition; and
   transmission output control function abnormality determining means for determining that said transmission output control means is abnormal upon receiving the reception of an electromagnetic wave having an intensity exceeding a predetermined threshold value even at the time of one of stop and reduction of the transmission output,
   wherein said transmission output control function abnormality determining means determines that said transmission output control means is abnormal in a case where a distance between the radar device and the target object exceeds a predetermined threshold value in one of the transmission output stop state and the transmission output reduction state.

2. The radar device according to claim 1, wherein said transmission output control function abnormality determining means stores a plurality of distances between the radar device and the target object in a memory, and determines that said transmission output control means is abnormal in a case where a maximum distance in number of the distances stored in the memory exceeds the predetermined threshold value in one of the transmission output stop state and the transmission output reduction state.

3. The radar device according to claim 1, wherein said transmission output control function abnormality determining means measures an intensity of the reception electromagnetic wave that has been reflected by the target object and received by said receiving means, and determines that said transmission output control means is abnormal in a case where the intensity exceeds the predetermined threshold value in one of the transmission output stop state and the transmission output reduction state.

4. The radar device according to claim 3, wherein said transmission output control function abnormality determining means determines that said transmission output control means is abnormal in a case where the intensity of the reception electromagnetic wave exceeds the predetermined threshold value set according to the distance between the radar device and the target object based on the measured intensity of the reception electromagnetic wave and the distance between the radar device and the target object at the time of measuring the intensity in the transmission output stop state.

5. The radar device according to claim 1, wherein said transmission output control function abnormality determining means determines that said transmission output control means is abnormal when a state where the intensity of the reception electromagnetic wave exceeds the predetermined threshold value continues for a certain period of time.

6. A radar device, comprising:
   transmitting means for transmitting an electromagnetic wave;
   receiving means for receiving the electromagnetic wave reflected by a target object of the transmission electromagnetic wave;
   target object measuring means for measuring at least a distance between the radar device and the target object on the basis of the transmission electromagnetic wave and the reception electromagnetic wave;
   transmission output control means for performing one of stopping and reducing a transmission output of said transmitting means under a predetermined condition; and
   transmission output control function abnormality determining means for determining that said transmission output control means is abnormal upon receiving the reception of an electromagnetic wave having an intensity exceeding a predetermined threshold value even at the time of one of stop and reduction of the transmission output,
   wherein said transmission output control function abnormality determining means determines that said transmission output control means is abnormal in a case where the distance between the radar device and the target object changes over time in the transmission output stop state.

7. The radar device according to claim 1, further comprising abnormality determination time processing means for stopping power supply of the radar device when said transmission output control function abnormality determining means determines that said transmission output control means is abnormal.

8. The radar device according to claim 1, further comprising abnormality determination time processing means for notifying an external device of an abnormality when said transmission output control function abnormality determining means determines that said transmission output control means is abnormal, wherein the radar device receives power supply from an external device, and wherein said abnormality determination time processing means stops the power supply from the external device to the radar device when the abnormality is determined.

9. The radar device according to claim 1, further comprising abnormality determination time processing means for notifying an external of an abnormality when said transmission output control function abnormality determining means determines that said transmission output control means is abnormal.

10. The radar device according to claim 6, further comprising abnormality determination time processing means for stopping power supply of the radar device when said transmission output control function abnormality determining means determines that said transmission output control means is abnormal.

11. The radar device according to claim 6, further comprising abnormality determination time processing means for notifying an external device of an abnormality when said transmission output control function abnormality determining means determines that said transmission output control means is abnormal, wherein the radar device receives power supply from an external device, and wherein said abnormality determination time processing means stops the power supply from the external device to the radar device when the abnormality is determined.

12. The radar device according to claim 6, further comprising abnormality determination time processing means for notifying an external of an abnormality when said transmission output control function abnormality determining means determines that said transmission output control means is abnormal.

* * * * *